United States Patent
Roche

(10) Patent No.: US 12,165,391 B2
(45) Date of Patent: Dec. 10, 2024

(54) EMPIRICAL METHOD AND SYSTEM FOR INCREASING THE ATTACH RATE OF OCR ENGINES TO IMAGES

(71) Applicant: Conduent Business Services, LLC, Florham Park, NJ (US)

(72) Inventor: Lee D Roche, Apex, NC (US)

(73) Assignee: Conduent Business Services, LLC, Florham Park, NJ (US)

( * ) Notice: Subject to any disclaimer, the term of this patent is extended or adjusted under 35 U.S.C. 154(b) by 204 days.

(21) Appl. No.: 17/707,079

(22) Filed: Mar. 29, 2022

(65) Prior Publication Data
US 2023/0316727 A1 Oct. 5, 2023

(51) Int. Cl.
*G06V 20/62* (2022.01)
*G06V 10/25* (2022.01)
*G06V 10/774* (2022.01)

(52) U.S. Cl.
CPC .......... *G06V 10/7747* (2022.01); *G06V 10/25* (2022.01); *G06V 20/625* (2022.01)

(58) Field of Classification Search
CPC .. G06V 10/7747; G06V 10/25; G06V 10/255; G06V 10/82; G06V 20/625
See application file for complete search history.

(56) References Cited

U.S. PATENT DOCUMENTS

| | | | |
|---|---|---|---|
| 9,082,038 B2 | 7/2015 | Kozitsky et al. | |
| 9,501,707 B2 | 11/2016 | Bulan et al. | |
| 9,965,677 B2 | 5/2018 | Bulan et al. | |
| 10,026,004 B2 | 6/2018 | Mizes et al. | |
| 10,909,845 B2 | 2/2021 | Bernal et al. | |
| 2012/0155712 A1* | 6/2012 | Paul | G06F 18/00 382/105 |
| 2013/0266190 A1* | 10/2013 | Wang | G06V 20/63 382/105 |
| 2014/0270350 A1* | 9/2014 | Rodriguez-Serrano | G06F 18/21 382/103 |
| 2016/0307061 A1 | 10/2016 | Bulan et al. | |

(Continued)

FOREIGN PATENT DOCUMENTS

| | | |
|---|---|---|
| EP | 2 887 333 B1 | 8/2018 |
| KR | 100985402 B1 * | 10/2010 |

OTHER PUBLICATIONS

Cantarini, Giorgio, Nicoletta Noceti, and Francesca Odone. "Boosting car plate recognition systems performances with agile retraining." In 2020 IEEE 4th International Conference on Image Processing, Applications and Systems (IPAS), pp. 102-107. IEEE, 2020. (Year: 2020).*

(Continued)

*Primary Examiner* — Carol Wang
(74) *Attorney, Agent, or Firm* — Ortiz & Lopez, PLLC; Kermit D. Lopez; Luis M. Ortiz

(57) ABSTRACT

Methods and systems for automatic license plate recognition (ALPR) can involve obtaining results from a manual image review of an image captured by one or more ALPR cameras and processed by an ALPR engine and feeding the results from the manual image review back to the ALPR engine to train the ALPR engine where to search in the image for a license plate. Training of the ALPR engine increase the attach rate of an optical character recognition (OCR) engine with respect to images captured the ALPR camera(s) and processed by the ALPR engine.

20 Claims, 3 Drawing Sheets

(56) References Cited

U.S. PATENT DOCUMENTS

| | | |
|---|---|---|
| 2017/0262723 A1 | 9/2017 | Kozitsky et al. |
| 2021/0067745 A1* | 3/2021 | Rosenberg ........... G06V 10/764 |
| 2021/0097300 A1* | 4/2021 | Schmer ................ G06F 18/254 |
| 2021/0097306 A1 | 4/2021 | Crary et al. |
| 2022/0058415 A1* | 2/2022 | LittleSun ............... G06V 20/62 |

OTHER PUBLICATIONS

Yepez, Juan, and Seok-Bum Ko. "Improved license plate localisation algorithm based on morphological operations." IET Intelligent Transport Systems 12, No. 6 (2018): 542-549. (Year: 2018).*

KR 100985402 translation (Year: 2010).*

Satadal Saha, "A Review on Automatic License Plate Recognition System"; Students' Technical Article Competition: PRAYAS-2018, Apr. 29, 2018.

Orhan Bulan, et al., "Segmentation- and Annotation-Free License Plate Recognition With Deep Localization and Failure Identification"; IEEE Transactions on Intelligent Transportation Systems. 2017.

\* cited by examiner

EMPIRICAL METHOD AND SYSTEM FOR INCREASING THE ATTACH RATE OF OCR ENGINES TO IMAGES

TECHNICAL FIELD

Embodiments are related to the field of image-processing and video-based detection. Embodiments are also related to the field of license plate recognition including Automatic License Plate Recognition (ALPR) methods, devices, and systems.

BACKGROUND

ALPR is a key enabler for several transportation applications. Though being a mature technology, a challenge with ALPR systems is scalability and minimizing human intervention in the existence of challenging noise sources present in license plate images captured under realistic conditions (i.e., field deployed solutions). These can include, for example, heavy shadows, non-uniform illumination, challenging optical geometries, partial occlusion, varying contrast, and general imaging noise. These challenging imaging conditions make it difficult to locate the license plate. Given these potential challenges, a number of captured license plate images cannot be recognized by a human, which in turn may lead to a waste of review effort and increased cost. Despite the use of automatic license plate image capture devices and software, it is still necessary to review the images and data captured and processed by ALPR systems.

ALPR systems can be employed in a variety of traffic surveillance applications, including toll monitoring, parking management, and detection of different types of traffic violation. FIG. 1 illustrates a high level block diagram providing an overview of operations and components of a prior art ALPR system 10. ALPR systems such as the example prior art ALPR system 10 shown in FIG. 1 typically include four stages. In the first stage, as shown at block 12, an image of a vehicle can be captured while the vehicle is moving (e.g., passing a toll booth). In this image acquisition stage, near infrared cameras are typically utilized to capture vehicle images both day and night time under low lighting conditions. In the second stage, as shown at block 14, the captured vehicle image is processed to localize the license plate region in the image. Many different methods may be implemented for license plate localization. After localizing the plate region in the image, the characters are segmented and extracted in the third stage, as shown at block 16. In the final stage, the segmented character images are recognized, as depicted at block 18, utilizing an OCR (Optical Character Recognition) engine trained in an offline phase.

Thereafter, as shown at block 20, an operation can be implemented to identify a state associated with the license plate. The OCR engine typically outputs a confidence score for each of the segmented character from which an overall confidence score is calculated for the entire plate. If the overall confidence score is higher than a pre-defined threshold, recognized license plate number are transmitted directly to the rest of the processing pipeline without human interruption as indicated at block 22. When the confidence score is less than the threshold, the license plate image can go to a manual human review process to avoid the serious public relations problem of issuing improper citations.

A problem with current ALPR systems is that many images are returned from the ALPR system without any license plates have been found in the images. This issue may vary by ambient environment (e.g., night, day, dusk), by weather conditions (e.g., Rain, Snow, Bright sun), by Vehicle Type (e.g., Bike, Car, Truck, etc.) by Camera supplier and by location (e.g., Plaza and Lane). When this occurs a large majority of images require a manual user to zoom in and pan across the image to find the Region of Interest (ROI). This manual image review process costs more than automated image review.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, an aspect of the embodiments to provide for improved ALPR methods, systems, and devices.

It is another aspect of the embodiments to provide for a method and system for improving the manual image review process for an ALPR engine.

It is a further aspect of the embodiments to provide for a method and system for training an ALPR engine based on region of interest (ROI) coordinates and magnification obtained in images subject to manual image review.

It is a further aspect of the embodiments to provide for an improved ALPR engine with an attach rate of OCR engines with respect to images.

The aforementioned aspects and other objectives and advantages can now be achieved as described herein. In an embodiment, a method for automatic license plate recognition (ALPR), can involve obtaining results from a manual image review of an image captured by an ALPR camera and processed by an ALPR engine and feeding the results from the manual image review back to the ALPR engine to train the ALPR engine where to search in the image for a license plate.

An embodiment can further involve identifying the license plate in the image.

An embodiment can further involve automatically magnifying a region of interest in the image after obtaining the results from the manual image review of the image processed by the ALPR engine.

In an embodiment, the results from the manual image review can be fed back to the ALPR engine after automatically magnifying the region of interest in the image.

An embodiment can further involve training the ALPR engine where to search in the region of interest of the image for the license plate after feeding the results from the manual image review back to the ALPR engine.

In an embodiment, a system for automatic license plate recognition (ALPR), can include one or more ALPR cameras that can capture an image, and an ALPR engine that can communicate with the ALPR camera(s), wherein results are obtained from a manual image review of an image captured by ALPR camera(s) and processed by the ALPR engine. The results can be fed from the manual image review back to the ALPR engine to train the ALPR engine where to search in the image for data indicative of a license plate.

In an embodiment, a computer program product for automatic license plate recognition (ALPR), can include one or more computer readable storage media and program instructions collectively stored on the one or more computer readable storage media. The program instructions can include program instructions to obtain results from a manual image review of an image captured by at least one ALPR camera and processed by an ALPR engine and feed the results from the manual image review back to the ALPR engine to train the ALPR engine where to search in the image for a license plate.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description of the invention, serve to explain the principles of the embodiments.

DETAILED DESCRIPTION

Figure 1:
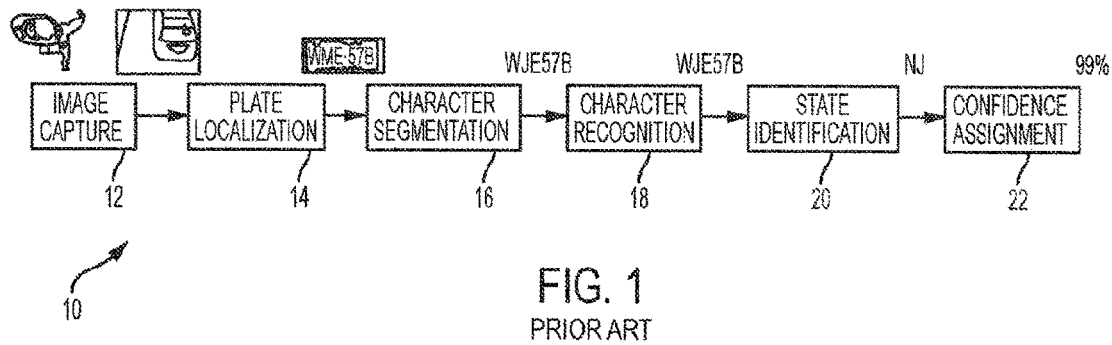
FIG. 1 illustrates a block diagram of a prior art ALPR (Automatic License Plate Recognition) system.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

After reading this description it will become apparent how to implement the embodiments described in various alternative implementations. Further, although various embodiments are described herein, it is understood that these embodiments are presented by way of example only, and not limitation. As such, this detailed description of various alternative embodiments should not be construed to limit the scope or breadth of the appended claims.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Several aspects of data-processing systems will now be presented with reference to various systems and methods. These systems and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A mobile "app" is an example of such software.

The term 'image' as utilized herein relates to a digital image, which is an image composed of picture elements, also known as pixels, each with finite, discrete quantities of numeric representation for its intensity or gray level that is an output from its two-dimensional functions fed as input by its spatial coordinates denoted with x, y on the x-axis and y-axis, respectively.

The term 'user interface' as utilized herein relates to the point of human-computer interaction and communication in a device. A user interface (UI) can include display screens, keyboards, a mouse and the appearance of a desktop. The UI is also the way through which a user can interact with an application or a website. An example of a UI is a graphical user interface (GUI).

The term "engine" as utilized herein relates to a software engine or aspects of a software engine. An "engine" may be a core component of a complex software system. The "engine" is a metaphor of, for example, a car's engine. Thus, an "engine" as utilized herein can relate to a complex subsystem. Although there is no formal guidance for what should be called an engine, the term has become entrenched in the software industry. Notable examples are database engine, graphics engine, search engine, and so on. In a web browser, for example, may include multiple engines such as, for example, a browser engine and a JavaScript engine.

The term "ALPR engine" as utilized herein relates to the technology (software and hardware) that offers license plate recognition on video or images. An ALPR engine may include ALPR-enabled features such as ALPR-enabled surveillance cameras, parking software, video management software and so on.

The term 'camera' as utilized herein may relate to an ALPR camera (also knowns as an ANPR (Automatic Number Plate Recognition) camera. ALPR/ANPR devices/cameras are highly accurate, cameras and/or software-based technologies, which are capable of automatically recognizing license plates (e.g., car/vehicle plates) under all weather conditions without the need for human intervention. An ALPR camera or an ANPR camera can be embedded with number plate recognition software and other license plate recognition modules in the context of an ALPR engine for all aspects of traffic monitoring, for example. This can include various enforcement measurements ranging from speed enforcement and red-light enforcement to parking, access control to priority lanes such as bus lanes, and so on. ALPR an also be applied in tolling when it comes to axle counting, free flow and stop and go tolling; as well as control of low emission zones. ALPR/ANPR cameras can also be used for vehicle tracking such as in homeland security missions. An ALPR camera as utilized herein can be a fixed camera or a mobile camera or implemented as a combination of fixed cameras and mobile cameras.

Figure 2:
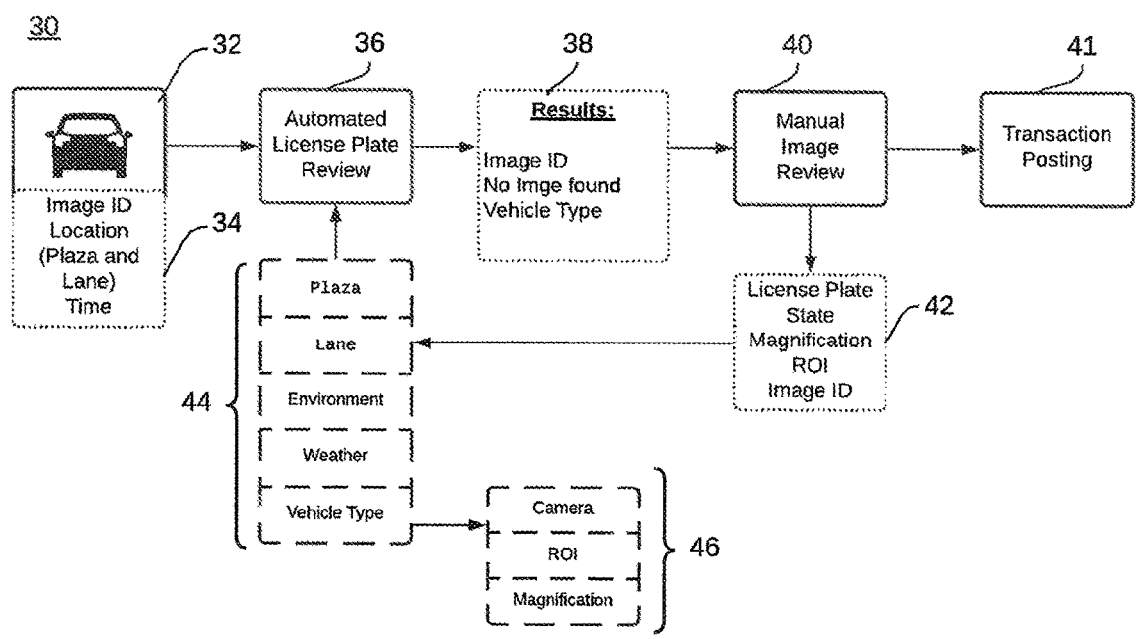
FIG. 2 illustrates a block diagram of an ALPR system, in accordance with an embodiment.

FIG. 2 illustrates a block diagram of an ALPR engine 30, which may be implemented in accordance with an embodiment. The ALPR engine 30 can be used to capture an image 32 of, for example, a vehicle and can include features such as shown and described herein with respect to FIG. 1, with the addition of the additional blocks, components, modules and other features shown in FIG. 2.

The ALPR engine 30 can thus include an ALPR camera such as camera 12 discussed previously, or other types of cameras and image-capturing devices or image-capturing systems, which can be used to capture the image 32. The ALPR engine 30 can convert the image to, for example, OCR and save the image into a memory or database for further processing by the ALPR engine 30. An OCR engine (not shown in FIG. 2) can be utilized as part of or with the ALPR engine 30 for implementing OCR operations with respect to the images captured by the ALPR engine 30. Thus, the ALPR engine 30 can include an OCR engine.

Note that a non-limiting example of an OCR engine, which can be adapted for use as part of the ALPR engine 30 in accordance with an embodiment is disclosed in U.S. Patent Application Publication No. 20160307061, entitled "Method and System for Bootstrapping an OCR Engine for License Plate Recognition," which published on Oct. 16, 2018 and is incorporated herein by reference in its entirety. U.S. Patent Application Publication No. 20160307061 is the publication of U.S. patent application Ser. No. 14/688,255, which is assigned to Conduent Business Services, LLC.

Image ID data 34 associated with the image 32 can include data such as, for example, a location (e.g., plaza and lane) and a time. The image 32 can be then subject to processing by an automated license plate review module 36. Note that the ability to identify a license plate is important to the overall ALPR process of the ALPR engine 30, because the license plate number is a primary key to allow ALPR engine 30 to search, report, query and provide video analytics with respect to the image data associated with the image 32.

Data generated by the automated license plate review module 36 can be provided as results 38. In the example shown in FIG. 2, the results 38 are shown as 'Image ID' with no license plate image found, but the vehicle type identified. The image 32 can be then subject to a manual image review 40. Data 42 such as, for example, a license plate, the state associated with the license plate, magnification in a region of interest (ROI), and the image ID (i.e., the ID associated with the image 32) can be extracted/obtained from the manual image review results.

This data can be used to identify information 44 such as location (plaza), a lane, the surrounding environment, the weather and the vehicle type, which can be then processed by the automated license plate review module 26. Additional information 46, such as, for example, camera data, ROI data and magnification data can be obtained or extracted from the information 44. Note that the term 'camera' as utilized herein may relate to an ALPR-enabled camera as discussed above.

Figure 3:
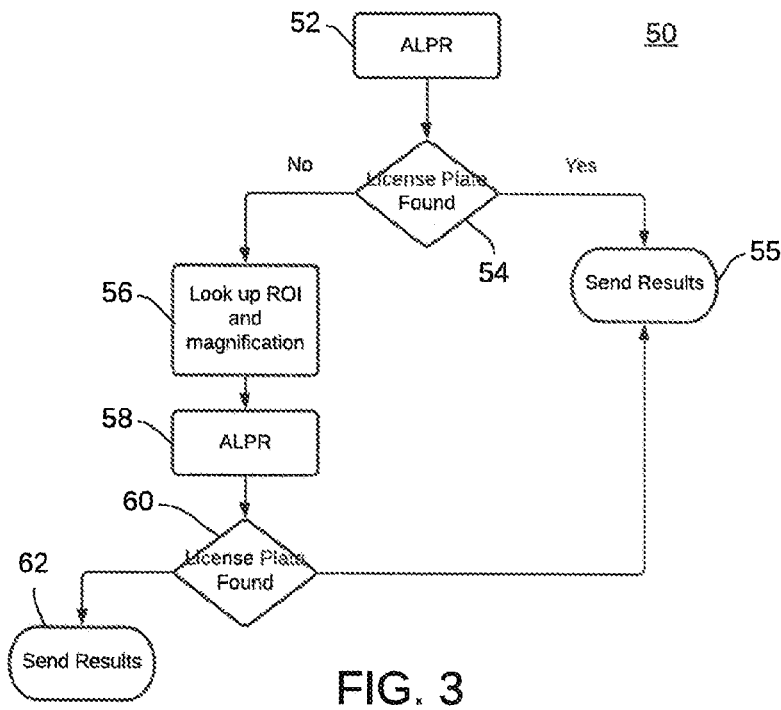
FIG. 3 illustrates a flow chart of operations depicting logical operation steps of a method for increasing the attach rate of an OCR engine to images, in accordance with an embodiment.

FIG. 3 illustrates a flow chart of operations depicting logical operation steps of a method 50 for increasing the attach rate of an OCR engine to images, in accordance with an embodiment. As shown at block 52, the ALPR engine 30 of FIG. 2 can be used to determine if a license plate has been identified (e.g., see the manual image review 40 in FIG. 2), as shown at block 52 and at decision block 54. As indicated at block 54, if a license plate has not been found as a result of the manual image review 40 shown in FIG. 2, a step or operation can be implemented, as depicted at block 56 to look up ROI and magnification.

Thereafter, as depicted at block 58, the ALPR engine 30 can be used again to determine if a license plate has been found. If so, as shown at decision block 60, results can be then sent/posted. This can correspond to the transaction posting 41 of FIG. 2. Returning to decision block 54, if the license plate has been found, then the results are sent or posted as shown at block 55. The operation shown at block 55 is similar to the transaction posting 41 of FIG. 2.

Figure 4:
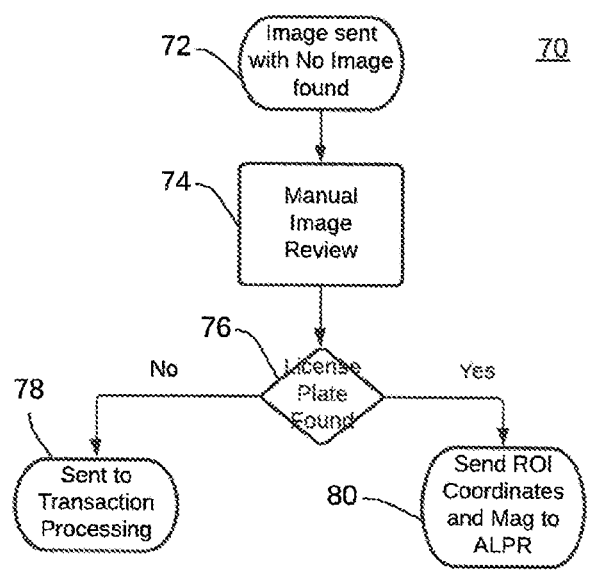
FIG. 4 illustrates a flow of operations depicting logical operational steps of a method for increasing the attach rate of an OCR engine to images, in accordance with an embodiment.

FIG. 4 illustrates a flow of operations depicting logical operational steps of a method 70 for increasing the attach rate of an OCR engine to images, in accordance with an embodiment. The method 70 shown in FIG. 3 can be implemented in association with the method 50 depicted in FIG. 3. As shown at block 72, a step or operation can be performed in which the image is sent with no image found. This image/data can be then subject to a manual image review 74 (which is analogous or identical to the manual image review 40 of FIG. 1).

Following processing of the operation shown at block 74, a test can be performed to determine if a license plate has been found/identified in the image, as depicted at block 76. If not license plate has been found in the image, then the image can be sent to transaction processing 41 (see FIG. 2) as shown at block 78. If, on the other hand, a license plate has been found/identified in the image, ROI coordinates and magnification data can be sent to the ALPR engine 30 as shown at block 80. In other words, the results from manual image review 40 shown in FIG. 4 can be fed back to the ALPR engine 30 to train the ALPR engine where to look for a license plate in the image.

Thus, for an image that has no license plate number returned, the manual image review 40 can review the image, and can capture the coordinates for the ROI and confirm the vehicle type. The ROI coordinates can be returned to the ALPR engine 30 for the image ID. The ALPR engine 30 can capture the ROI coordinates and magnification required for the Location (e.g., Plaza and Lane) and Vehicle Type, for use in the future (e.g., see information 44 and information 46 in FIG. 2). The next time a vehicle type is found in the ALPR for that location and no image is found, the ALPR engine 30 can use the ROI coordinates and magnification and rerun the process based on the data provided from the manual image review 40.

Figure 5:
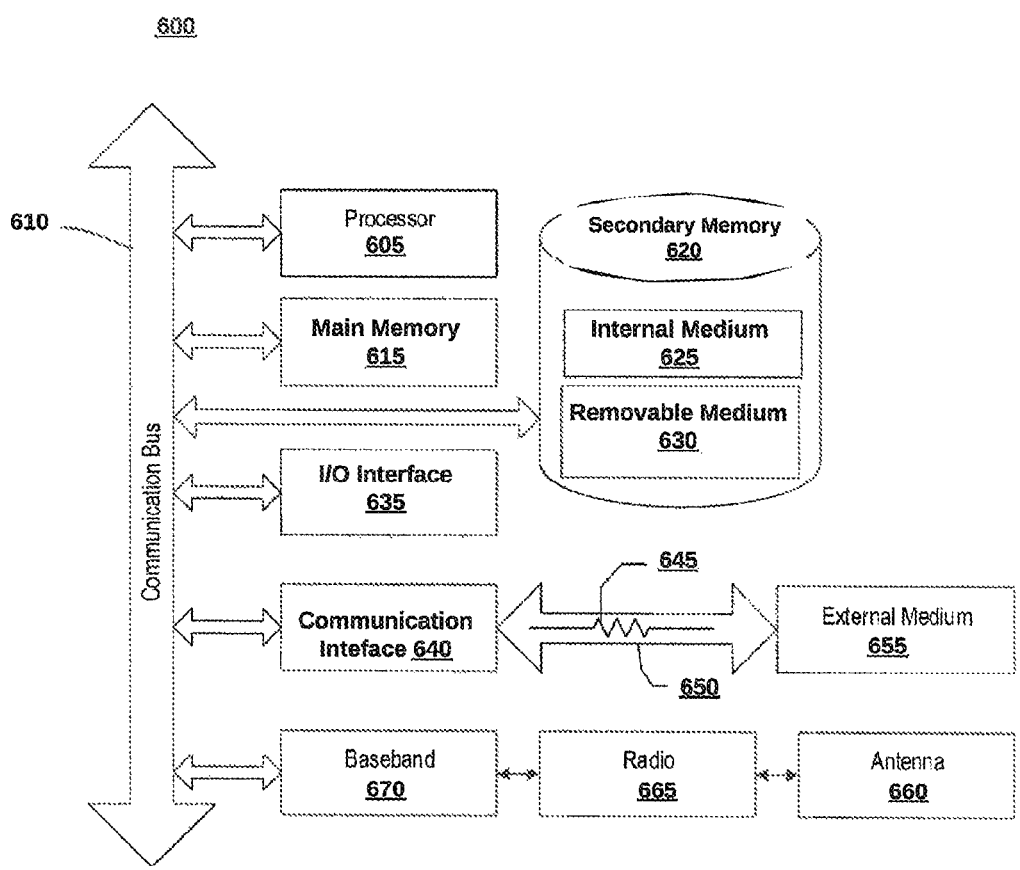
FIG. 5 illustrates a block diagram of a computing system that can be adapted for use with an embodiment.

FIG. 5 illustrates a block diagram of a computing system 600 that can be adapted for use with an embodiment. Note that the term 'computing system' as utilized herein can also refer to a 'computer', a 'computing device' or a 'data-processing apparatus'. The computing system 600 can be implemented as a wired and/or wireless computer device suitable for use in one or more embodiments. The computing system 600 may be used to the implement manual-based image review system 70. The computing system 600 may be programmed with software comprising instructions that, when executed by at least one processor, cause the manual-based image review system 70 to perform the various ALPR modules, steps, operations, functions, processes, and/or methods described herein, in connection to, for example, FIG. 2, FIG. 3, and FIG. 4.

In various embodiments, the computing system 600 can be a personal computer, computer server, personal digital assistant, smart phone, tablet computer, or any other processor-enabled device that is capable of wired or wireless data communication. A server is an example of a type of computing system. Other computer systems and/or architectures may be also used, as will be clear to those skilled in the art.

The computing system 600 preferably includes one or more processors, such as processor 605. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 605.

The processor 605 is preferably connected to a communication bus 610. The communication bus 610 may include a data channel for facilitating information transfer between storage and other peripheral components of the computing system 600. The communication bus 610 further may provide a set of signals used for communication with the processor 605, including a data bus, address bus, and control bus (not shown). The communication bus 610 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPM"), IEEE 696/S-100, and the like.

Computing system 600 preferably includes a main memory 615 and may also include a secondary memory 620. The main memory 615 provides storage of instructions and data for programs executing on the processor 605. For example, the main memory 615 may provide storage for modules or engines, a graphical user interface and so on, which may be representative of software modules or engine that, when executed by the processor 605, can perform the functions described in FIG. 2, FIG. 3, and FIG. 4, and elsewhere herein.

The main memory 615 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 620 may optionally include an internal memory 625 and/or a removable storage medium 630, for example a floppy disk drive, a magnetic tape drive, a compact disc ("CD") drive, a digital versatile disc ("DVD") drive, etc. The removable storage medium 630 can be read from and/or written to in a well-known manner. Removable storage medium 630 may be, for example, a floppy disk, magnetic tape, CD, DVD, SD card, etc.

The removable storage medium 630 is a non-transitory computer readable medium having stored thereon computer executable code (i.e., software) and/or data. The computer software or data stored on the removable storage medium 630 is read into the computing system 600 for execution by the processor 605.

In some embodiments, the secondary memory 620 may include other similar means for allowing computer programs or other data or instructions to be loaded into the computing system 600. Such means may include, for example, an external storage medium 655 and a communication interface 640. Examples of external storage medium 655 may include an external hard disk drive or an external optical drive, or and external magneto-optical drive.

Other examples of secondary memory 620 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are the removable storage medium 630 and a communication interface, which allow software and data to be transferred from an external storage medium 655 to the computing system 600.

The computing system 600 may also include an input/output ("I/O") interface 635. The I/O interface 635 facilitates input from and output to external devices. For example, the I/O interface 635 may receive input from a keyboard, mouse, touch screen, gestures detecting camera, speech command module, etc. and may provide output to a display generated by the graphical user interface. The I/O interface 635 is capable of facilitating input from and output to various alternative types of human interface and machine interface devices alike.

The computing system 600 may also include a communication interface 640. The communication interface 640 can allow software and data to be transferred between computing system 600 and external devices (e.g., printers), networks, or information sources. For example, computer software or executable code may be transferred to computing system 600 from a network server via communication interface 640. Examples of communication interface 640 include a modem, a network interface card ("NIC"), a wireless data card, a communications port, a PCMCIA slot and card, an infrared interface, and an IEEE 1394 fire-wire, just to name a few.

Communication interface 640 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via the communication interface 640 are generally in the form of the electrical communication signals 645. The electrical communication signals 645 are preferably provided to the communication interface 640 via a communication channel 650. In one embodiment, the communication channel 650 may be a wired or wireless network, or any variety of other communication links. The communication channel 650 carries the electrical communication signals 645 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 615 and/or the secondary memory 620. Computer programs can also be received via the communication interface 640 and stored in the main memory 615 and/or the secondary memory 620. Such computer programs, when executed, enable the computing system 600 to perform the various functions of the present invention as previously described.

In this description, the term "computer readable medium" can be used to refer to any non-transitory computer readable storage media used to provide computer executable code (e.g., software and computer programs) to the computing system 600. Examples of these media include the main memory 615, the secondary memory 620 (including the internal memory 625, the removable storage medium 630, and the external storage medium 655), and any peripheral device communicatively coupled with the communication interface 640 (including a network information server or other network device). These non-transitory computer readable mediums are means for providing executable code, programming instructions, and software to the computing system 600.

In an embodiment implemented using software, the software may be stored on a computer readable medium and loaded into the computing system 600 by way of removable storage medium 630, I/O interface 635, or communication interface 640. In such an embodiment, the software is loaded into the computing system 600 in the form of electrical communication signals 645. The software, when executed by the processor 605, preferably causes the processor 605 to perform the inventive features and functions previously described herein.

The computing system 600 can also include optional wireless communication components that facilitate wireless communication over a voice and over a data network. The wireless communication components can comprise an antenna system 660, a radio system 665 and a baseband system 670. In the computing system 600, radio frequency ("RF") signals are transmitted and received over the air by the antenna system 660 under the management of the radio system 665.

In one embodiment, the antenna system 660 may comprise one or more antennae and one or more multiplexors (not shown) that perform a switching function to provide the antenna system 660 with transmit and receive signal paths. In the receive path, received RF signals can be coupled from a multiplexor to a low noise amplifier (not shown) that amplifies the received RF signal and sends the amplified signal to the radio system 665.

In alternative embodiments, the radio system 665 may comprise one or more radios that are configured to communicate over various frequencies. In one embodiment, the radio system 665 may combine a demodulator (not shown) and modulator (not shown) in one integrated circuit ("IC"). The demodulator and modulator can also be separate components. In the incoming path, the demodulator strips away the RF carrier signal leaving a baseband received audio signal, which is sent from the radio system 665 to the baseband system 670.

If the received signal contains audio information, then baseband system 670 decodes the signal and converts it to an analog signal. Then the signal is amplified and sent to a speaker. The baseband system 670 also receives analog audio signals from a microphone. These analog audio signals are converted to digital signals and encoded by the baseband system 670. The baseband system 670 also codes the digital signals for transmission and generates a baseband transmit audio signal that is routed to the modulator portion of the radio system 665. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 660 where the signal is switched to the antenna port for transmission.

The baseband system 670 is also communicatively coupled with the processor 605. The processor 605 has access to one or more data storage areas including, for example, but not limited to, the main memory 615 and the secondary memory 620. The processor 605 is preferably configured to execute instructions (i.e., computer programs or software) that can be stored in the main memory 615 or in the secondary memory 620. Computer programs can also be received from the baseband system 670 and stored in the main memory 615 or in the secondary memory 620 or executed upon receipt. Such computer programs, when executed, enable the computing system 600 to perform the various functions of the present invention as previously described. For example, the main memory 615 may include various software modules (not shown) that can be executable by processor 605.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments.

The hardware that can be used to implement the various illustrative logics, logical blocks (e.g., such as the various blocks shown and described herein with respect to FIG. 1 to FIG. 5), modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some steps or methods may be performed by circuitry that may be specific to a given function.

In one or more exemplary aspects, the functions described can be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer.

The terms 'Disk' and 'disc', as used herein, can include, for example, compact disc (CD), laser disc, optical disc, digital versatile disc (DVD), floppy disk, and Blu-ray disc where disks usually reproduce data magnetically, while discs may reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

While various embodiments have been described above, it should be understood that they have been presented by way of example only, and not of limitation. The breadth and scope should not be limited by any of the above-described example embodiments. Where this document refers to technologies that would be apparent or known to one of ordinary skill in the art, such technologies encompass those apparent or known to the skilled artisan now or at any time in the future. In addition, the described embodiments are not restricted to the illustrated example architectures or configurations, but the desired features can be implemented using a variety of alternative architectures and configurations. As will become apparent to one of ordinary skill in the art after reading this document, the illustrated embodiments and their various alternatives can be implemented without confinement to the illustrated example. One of ordinary skill in the art would also understand how alternative functional, logical or physical partitioning and configurations could be utilized to implement the desired features of the described embodiments.

Furthermore, although items, elements or components can be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases can be absent.

While various embodiments have been described above, it is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Furthermore, the functionalities including operations, steps and instructions described herein may be implemented entirely and non-abstractly as physical hardware, entirely as physical non-abstract software (including firmware, resident software, micro-code, etc.) or combining non-abstract software and hardware implementations that may all generally be referred to herein as a "circuit," "module," "engine", "component," "block", "database", "agent" or "system." Furthermore, aspects of the embodiments may take the form of a computer program product embodied in one or more non-ephemeral computer readable media having computer readable and/or executable program code embodied thereon. The term "engine" in particular can relate to a "software engine".

Although not required, the disclosed embodiments can be described in the general context of computer-executable instructions, such as program modules, being executed by a single computer. In most instances, a "module" (also referred to as an "engine") may constitute a software application but can also be implemented as both software and hardware (i.e., a combination of software and hardware).

Generally, modules implemented as program modules may include, but are not limited to, routines, subroutines, software applications, programs, objects, components, data structures, etc., that can perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein can refer to a collection of routines and data structures, which can perform a particular task or can implement a particular data type. A module can be composed of two parts: an interface, which lists the constants, data types, variable, and routines that can be accessed by other modules or routines, and an implementation, which is typically private (accessible only to that module), and which includes source code that actually implements the routines in the module. The term module may also simply refer to an application, such as a computer program designed to assist in the performance of a specific task, such as word processing, accounting, inventory management, etc.

In some example embodiments, the term "module" can also refer to a modular hardware component or a component that can be a combination of hardware and software. It should be appreciated that implementation and processing of the disclosed modules, whether primarily software-based and/or hardware-based or a combination thereof, according to the approach described herein can lead to improvements in processing speed and ultimately in energy savings and efficiencies in a system such as, for example, the manual-based image review system 70 described herein. That is, as discussed previously, the embodiments can increase the attach rate of OCR engines to images.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for automatic license plate recognition (ALPR), comprising:
    extracting results from a manual image review of an image among a plurality of images captured by at least one ALPR camera and processed by an ALPR engine associated with an OCR engine and which includes the at least one ALPR camera, wherein the manual image review occurs after an initial automatic license plate review of the image;
    feeding the results from the manual image review in a processing pipeline back to the ALPR engine to train the ALPR engine; and
    training the ALPR engine where to search in a region of interest of the image for a license plate after feeding the results from the manual image review in the processing pipeline back to the ALPR engine to facilitate by the training of the ALPR engine an increase in an attach rate of the OCR engine to the plurality of images.

2. The method of claim 1, further comprising identifying the license plate in the image.

3. The method of claim 1 further comprising automatically magnifying a region of interest in the image after extracting the results from the manual image review of the image processed by the ALPR engine.

4. The method of claim 1 wherein the results from the manual image review are fed back to the ALPR engine after automatically magnifying the region of interest in the image.

5. The method of claim 1 further comprising outputting from the OCR engine a confidence score for each of a segmented character from which an overall confidence score is calculated for all of the license plate, wherein if the overall confidence score is higher than a pre-defined threshold, a recognized license plate number of the license plate is transmitted to a remaining portion of the processing pipeline without human interruption.

6. The method of claim 1 further comprising:
    automatically magnifying a region of interest in the image after extracting the results from the manual image review of the image processed by the ALPR engine, wherein the results from the manual image review are fed back to the ALPR engine after automatically magnifying the region of interest in the image.

7. The method of claim 1 wherein the ALPR engine further comprises parking software and video management software.

8. A system for automatic license plate recognition (ALPR), comprising:
    at least one ALPR camera that captures an image; and
    an ALPR engine comprising the at least one ALPR camera, wherein the ALPR engine is associated with an OCR engine and communicates with the at least one ALPR camera, wherein results are extracted from a manual image review of the image among a plurality of images captured by the at least one ALPR camera and processed by the ALPR engine, and wherein the results are fed in a processing pipeline from the manual image review back to the ALPR engine to train the ALPR engine where to search in a region of interest of the image for data indicative of a license plate after feeding the results from the manual image review in the processing pipeline back to the ALPR engine to facilitate by the training of the ALPR engine an increase in an attach rate of the OCR engine to the plurality of images, wherein the manual image review occurs after an initial automatic license plate review of the image.

9. The system of claim 8, wherein the ALPR engine identifies the license plate in the image based on the data indicative of the license plate.

10. The system of claim 9 wherein the ALPR engine automatically magnifies the region of interest in the image after extracting the results from the manual image review of the image processed by the ALPR engine.

11. The system of claim 9 wherein the results from the manual image review are fed back to the ALPR engine after automatically magnifying the region of interest in the image.

12. The system of claim 9 wherein: a confidence score is output from the OCR engine for each of a segmented character from which an overall confidence score is calculated for all of the license plate, wherein if the overall confidence score is higher than a pre-defined threshold, a recognized license plate number of the license plate is transmitted to a remaining portion of the processing pipeline without human interruption.

13. The system of claim 9 wherein:
the ALPR engine automatically magnifies the region of interest in the image after obtaining the results from the manual image review of the image processed by the ALPR engine, wherein the results from the manual image review are fed back to the ALPR engine after automatically magnifying the region of interest in the image.

14. The system of claim 9 wherein:
the ALPR engine automatically magnifies the region of interest in the image after obtaining the results from the manual image review of the image processed by the ALPR engine.

15. A non-transitory computer program product for automatic license plate recognition (ALPR), the non-transitory computer program product comprising one or more computer readable storage media and program instructions collectively stored on the one or more computer readable storage media, the program instructions comprising program instructions to:
extract results from a manual image review of an image among a plurality of images captured by at least one ALPR camera and processed by an ALPR engine associated with an OCR engine and which includes the at least one ALPR camera, wherein the manual image review occurs after an initial automatic license plate review of the image;
feed the results from the manual image review back to the ALPR engine to train the ALPR engine; and
train the ALPR engine where to search in a region of interest of the image for a license plate after feeding the results from the manual image review in the processing pipeline back to the ALPR engine to facilitate by the training of the ALPR engine an increase in an attach rate of the OCR engine to the plurality of images.

16. The non-transitory computer program product of claim 15, wherein the program instructions further comprise program instructions to identify the license plate in the image.

17. The non-transitory computer program product of claim 15, wherein the program instructions further comprise program instructions to automatically magnify the region of interest in the image after obtaining the results from the manual image review of the image processed by the ALPR engine.

18. The non-transitory computer program product of claim 15, wherein the results from the manual image review are fed back to the ALPR engine after automatically magnifying the region of interest in the image.

19. The non-transitory computer program product of claim 15, wherein the program instructions further comprise program instructions to output a confidence score from the OCR engine for each of a segmented character from which an overall confidence score is calculated for all of the license plate, wherein if the overall confidence score is higher than a pre-defined threshold, a recognized license plate number of the license plate is transmitted to a remaining portion of the processing pipeline without human interruption.

20. The non-transitory computer program product of claim 15, wherein the program instructions further comprise program instructions to automatically magnify the region of interest in the image after obtaining the results from the manual image review of the image processed by the ALPR engine, wherein the results from the manual image review are fed back to the ALPR engine after automatically magnifying the region of interest in the image.

\* \* \* \* \*